United States Patent [19]

Enkner et al.

[11] Patent Number: 4,697,274

[45] Date of Patent: Sep. 29, 1987

[54] ELECTRIC MELTING FURNACE ARRANGEMENT AS WELL AS A METHOD OF INFLUENCING THE COMPOSITION OF A MINERAL MELT FOR PRODUCING WOOL

[75] Inventors: Bernhard Enkner; Leopold Amon, both of Linz; Alfred Kübelböck, Zwettl/Rodl; Wolfgang Trimmel, Leoben; Paul Nalepka, Niklasdorf; Leopold Schropp, Linz; Helmut Schwaighofer, Neumarkt; Reinhard Pum, Linz; Manfred Traxler, Hart; Franz Tasch, Bad Mitterndorf, all of Austria

[73] Assignee: Voest-Alpine Aktiengesellschaft, Linz, Austria

[21] Appl. No.: 775,537

[22] Filed: Sep. 13, 1985

[30] Foreign Application Priority Data

Sep. 18, 1984 [AT] Austria ................... 2964/84

[51] Int. Cl.$^4$ .............................................. F27D 3/00
[52] U.S. Cl. .......................................... 373/79; 373/81
[58] Field of Search ................ 373/79, 81; 414/147, 414/152, 156, 157, 158, 160, 162, 187

[56] References Cited

U.S. PATENT DOCUMENTS

| 2,523,092 | 9/1950 | Bryk et al. | 373/81 |
| 3,737,554 | 6/1973 | Horibe et al. | 373/81 |
| 3,760,960 | 9/1973 | Schumacher et al. | 373/81 |
| 3,936,588 | 2/1976 | Asphaug et al. | 373/81 |
| 4,435,815 | 3/1984 | Evensen | 373/81 |

Primary Examiner—Roy N. Envall, Jr.
Attorney, Agent, or Firm—Hopgood, Calimafde, Kalil, Blaustein & Judlowe

[57] ABSTRACT

An electric melting furnace arrangement for the continuous melting of spinnable mineral fine-particle or granular materials has a refractorily lined furnace vessel, a plurality of electrodes arranged on a partial circle extending into the furnace vessel from above, conveying devices for the materials to be melted designed as dosing pipes arranged close to the partial circle formed by the electrodes and each provided between two electrodes and a tapping device penetrating a side wall of the furnace vessel. Transporting devices are provided for admitting the dosing pipes, and when the dosing pipes are completely full, the further conveying of the materials to be melted is interruptable. In a method of influencing the composition of a mineral melt for producing wool in that electric melting furnace arrangement, iron-oxide-containing materials are used as starting materials and metallic aluminum is added thereto for reducing iron oxide to metallic iron, and the metallic iron collecting on the bottom of the furnace vessel is removed via a further tap.

9 Claims, 9 Drawing Figures

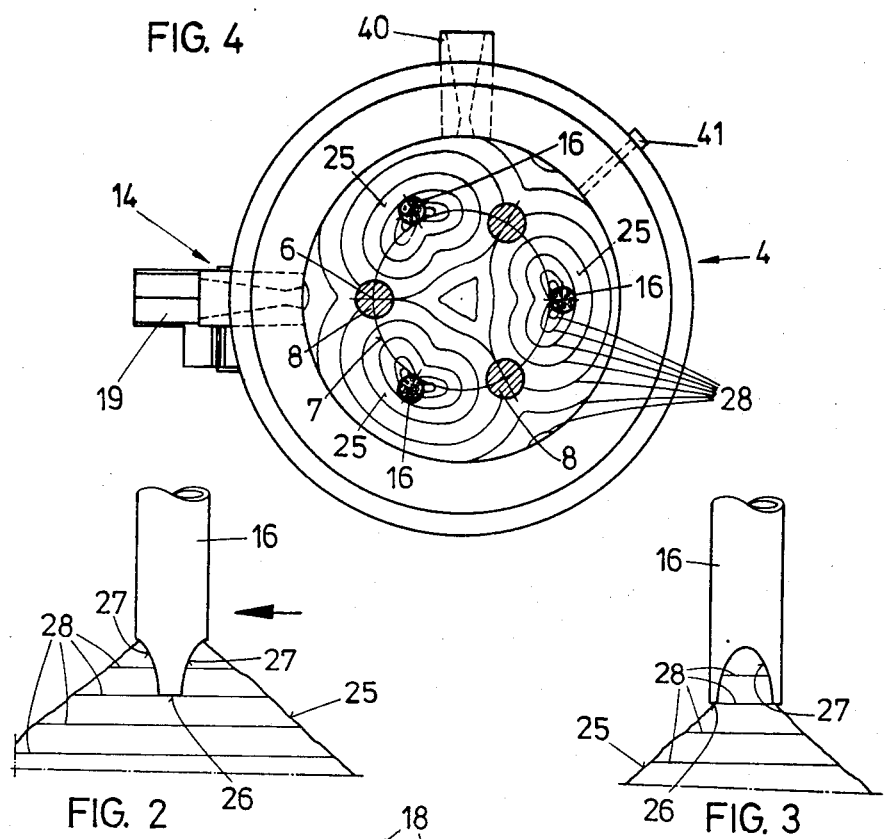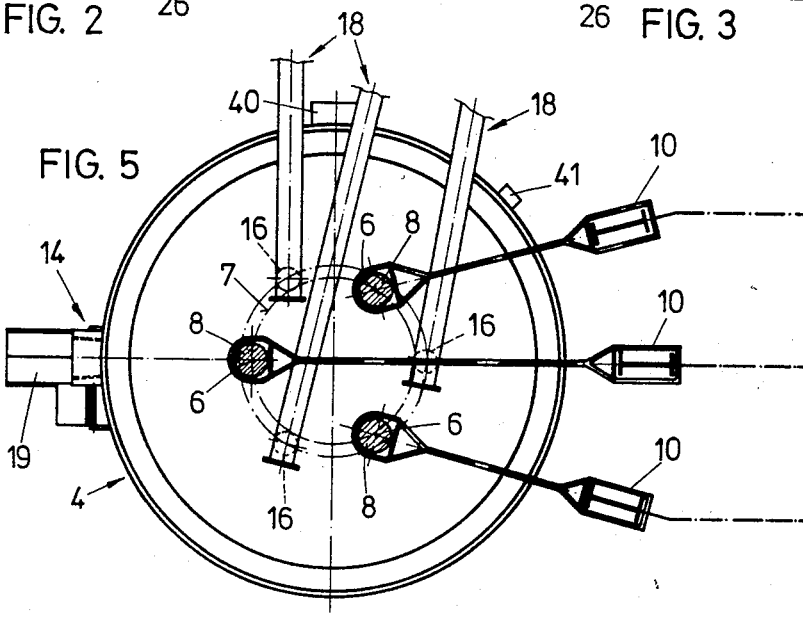

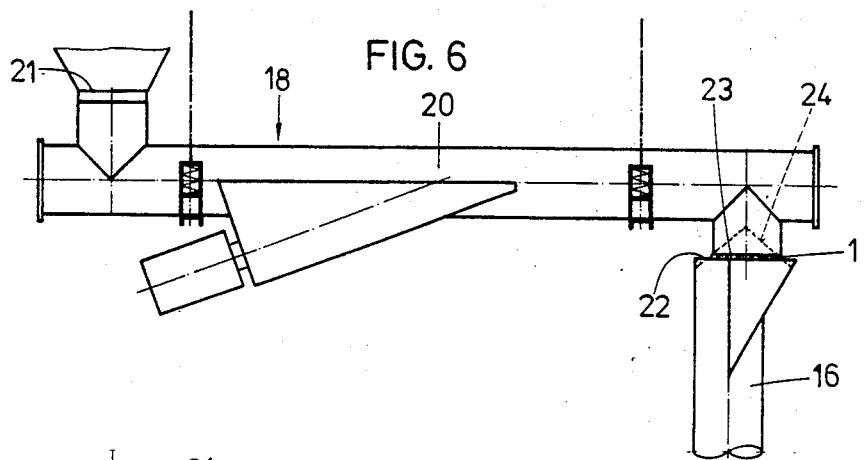
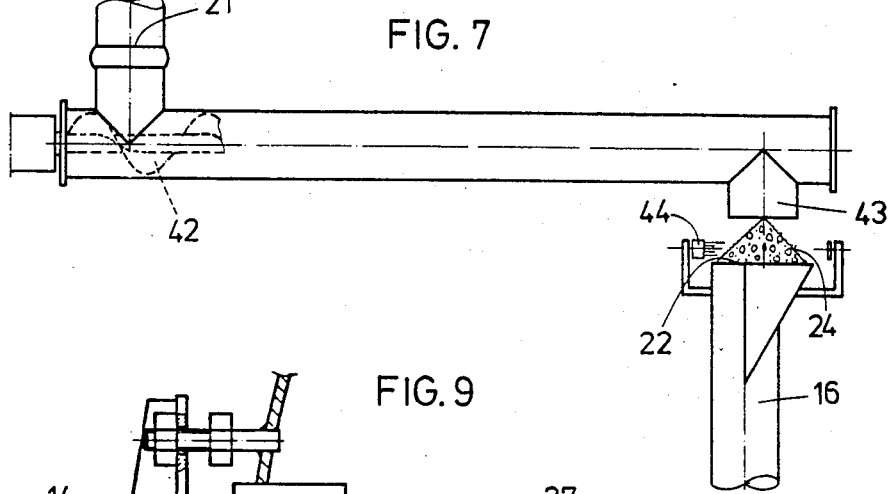
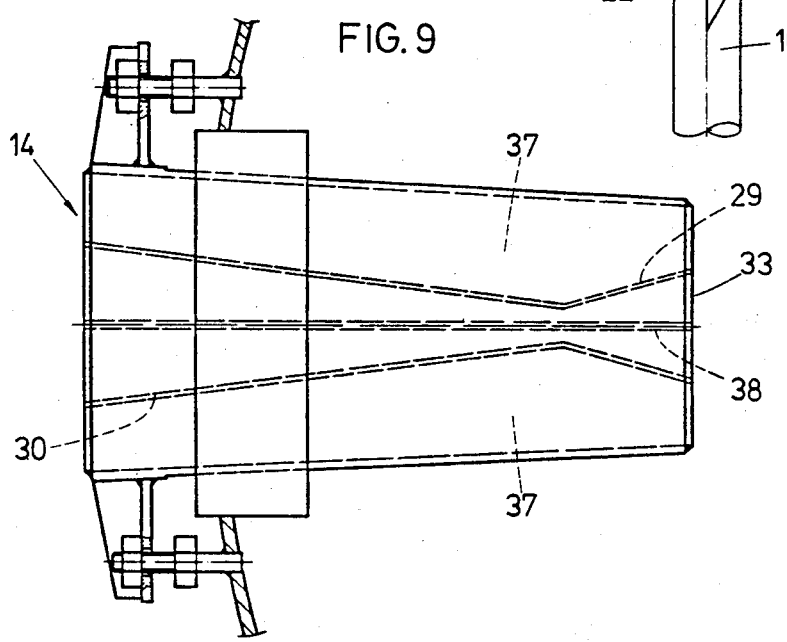

ELECTRIC MELTING FURNACE ARRANGEMENT AS WELL AS A METHOD OF INFLUENCING THE COMPOSITION OF A MINERAL MELT FOR PRODUCING WOOL

The invention relates to an electric melting furnace for continuously melting mineral fine-particle or granular materials capable of being spun, and including a refractorily lined furnace vessel, a plurality of electrodes arranged on a partial circle and extending into the furnace vessel from its upper side, conveying means for supplying the materials to be melted from above, and at least one tapping means penetrating one side wall of the furnace vessel.

An electric melting furnace of this kind for melting meltable oxide compounds, such as slag, is known from German Offenlengungsschrft No. 30 19 812. The known electric melting furnace is filled with melt to close to its upper rim, the melt being covered by material to be melted of still granular form. The material to be melted is conveyed to the electric melting furnace via a conveyor belt, and is charged via charging devices. The melt reaching up to the upper rim of the electric melting furnace constitutes a high thermal load on the furnace vessel, so that the known furnace must be provided with an external cooling. Furthermore, with the known furnace it is not possible to keep the height of the material to be melted, floating on the melt, constant, particularly since the level of the melt extends to far above the tapping device, whereby the height of the bath level of the melt bath varies. Thus, also the pressure acting on the tapping means varies, and so does the amount of melt flowing out of the tapping means per time unit. This is particularly disadvantageous if the melt is to be spun, because a spinning device must continuously be provided with an amount of melt that always remains constant per time unit.

Hitherto, the highly ununiform melting performance per time unit of known electric melting furnaces has been the reason why one had to be satisfied with melting performances of up to 200 kg/h. Due to the increased demand for insulating materials and for reasons of rentability attempts are made at changing over to larger production units, e.g., to production units producing between 1 and 4 t of spinnable material per hour. Large production units could hitherto be obtained only with a cupola melting furnace, which, however, has the disadvantage of being dependent on fuel. Further disadvantages are that the emissions emerging from a cupola melting furnace necessitate complex off-gas processing plants and that the wool fibres have an ash content.

The invention aims at avoiding these disadvantages and difficulties and has as its object to provide an electric melting furnace of the initially defined kind, with which high melting performances, in particular melting performances of between 1 and 4 t/h are possible, and with which a uniform outflow of melt per time unit is obtained, when producing high-grade wool of mineral materials.

According to the invention, this object is achieved in that the conveying means for the materials to be melted are formed by a plurality of dosing pipes provided close to the partial circle formed by the electrodes, between two electrodes each, and that the dosing pipes are admitted by transporting devices, such as vibrating channels, conveyor belts or worm conveyors, wherein, when the dosing pipes are completely filled, the conveying of further material to be melted is interruptable. By the measures according to the invention, a high uniformity of charging and thus an extremely uniform flow of melt is obtained with a high melting performance. Irregularities in the charging lead to an ununiform amount of outflow, since the solid charging material resting on the melting bath exerts a pressure on the melting bath in dependence on its weight, which has a direct effect on the outflow amount per time unit. It has shown that very slight pressure changes already suffice for substantially changing the outflow amount per time unit.

Advantageously, the dosing pipes are each provided with a wall recess extending vertically upwardly from the mouth and located at the sides facing the electrodes, whereby in the region of the electrodes more charging material is present. This, on the one hand, increases the protection of the electrodes, and on the other hand, takes into account that substantially more charging material is melted around the electrodes than in the remaining regions of the furnace vessel. This leads to a uniform load on the melt by the material not yet melted, thereby favorably influencing the uniform outflow of melt.

A further preferred embodiment is characterized in that the transporting device is formed as vibrating channel, whose conveying opening ends above the dosing pipe, whereby, when an upwardly directed dumping cone is formed at the upper opening of the dosing pipe, the further conveying of material to be melted is automatically interrupted by means of the vibrating channel. As soon as the dumping cone at the upper side of a dosing pipe reaches into the vibrating channel, the latter stops conveying due to a material jam, thus rendering a surveillance of the conveying unnecessary.

A further advantageous embodiment is characterized in that at the upper opening of each dosing pipe a sensor, e.g., a photoelectric barrier, is provided, which, when the dosing pipe is completely filled and a dumping cone is forming, stops the transporting device. This embodiment is of particular advantage if conveyor belts or worm conveyors are used as the transporting means.

For further enhancing a uniform outflow of melt the tapping device is suitable formed by a water-cooled tapping pipe insertable into the side wall of the electric melting furnace and has a pipe portion rising from the furnace inner side in direction towards outside and a pipe portion downwardly inclined towards the furnace outer side, for forming an overflow edge, the overflow edge being arranged at a vertical distance below the upper side of the mouth of the pipe portion located at the furnace inner side. Thereby, the melt is not withdrawn directly from the surface, but from a hotter region below the surface, and a uniformly high temperature and purity of the withdrawn melt is ensured.

Suitably, an aerating pipe extending through the cavity of the tapping device is provided above the tapping pipe for drawing off gases that may form. By this measure, the pressure exerted by the granular charging material on the melt and thus the outflow of the melt is made still more uniform.

Suitably, the tapping pipe is designed so as to be converging from the furnace inner side to the overflow edge in its ground plan, and diverging from the overflow edge to the furnace outer side.

For enabling an exchange of the tapping device without having to interrupt the furnace operation, advantageously a closable emergency tap is provided at a level of the furnace vessel below the tapping device usable in case of disturbances, whereby it is possible to lower the bath level after opening of the emergency tap and subsequently exchange the tapping device.

A method for influencing the composition of mineral melt for producing wool in an electric melting furnace according to the invention by using iron-oxide containing starting materials is characterized in that metallic aluminum, possibly with aluminum oxide, is added to the materials to be melted, which reduces iron oxide to metallic iron collecting at the bottom of the electric melting furnace and being removed through a third tap, wherein advantageously aluminum dross is added to the charging materials. The third tap not only serves for tapping the pig iron, but also for completely emptying the vessel. An off-gas (CO) possibly forming at the reduction is drawn off via the furnace lid.

The invention shall now be explained in more detail by way of the accompanying drawings, wherein FIG. 1 is a section through an electric melting furnace in a schematical illustration;

FIGS. 2 and 3 show details of FIG. 1 on an enlarged scale, FIG. 3 being a view in the direction of the arrow III of FIG. 2;

FIG. 4 shows a section along line IV—IV of FIG. 1, also on an enlarged scale;

FIG. 5 is a section according to line V—V of FIG. 1,

Figure 1:
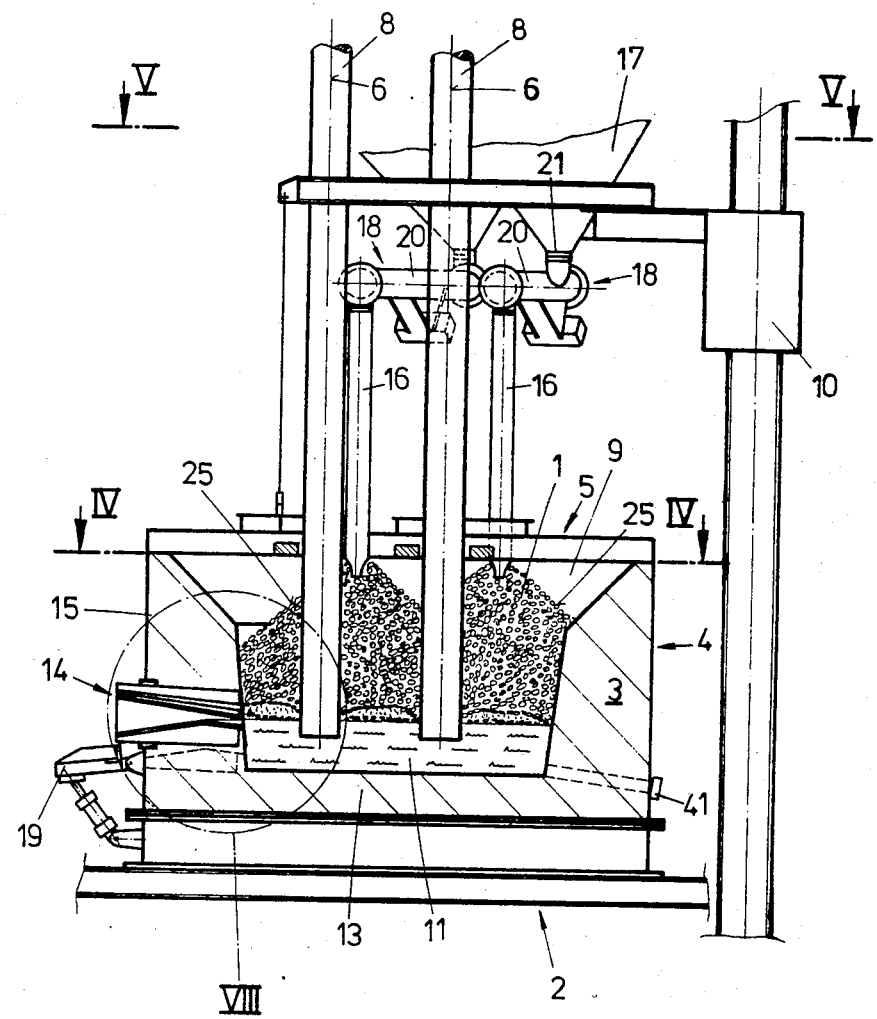
Figure 8:
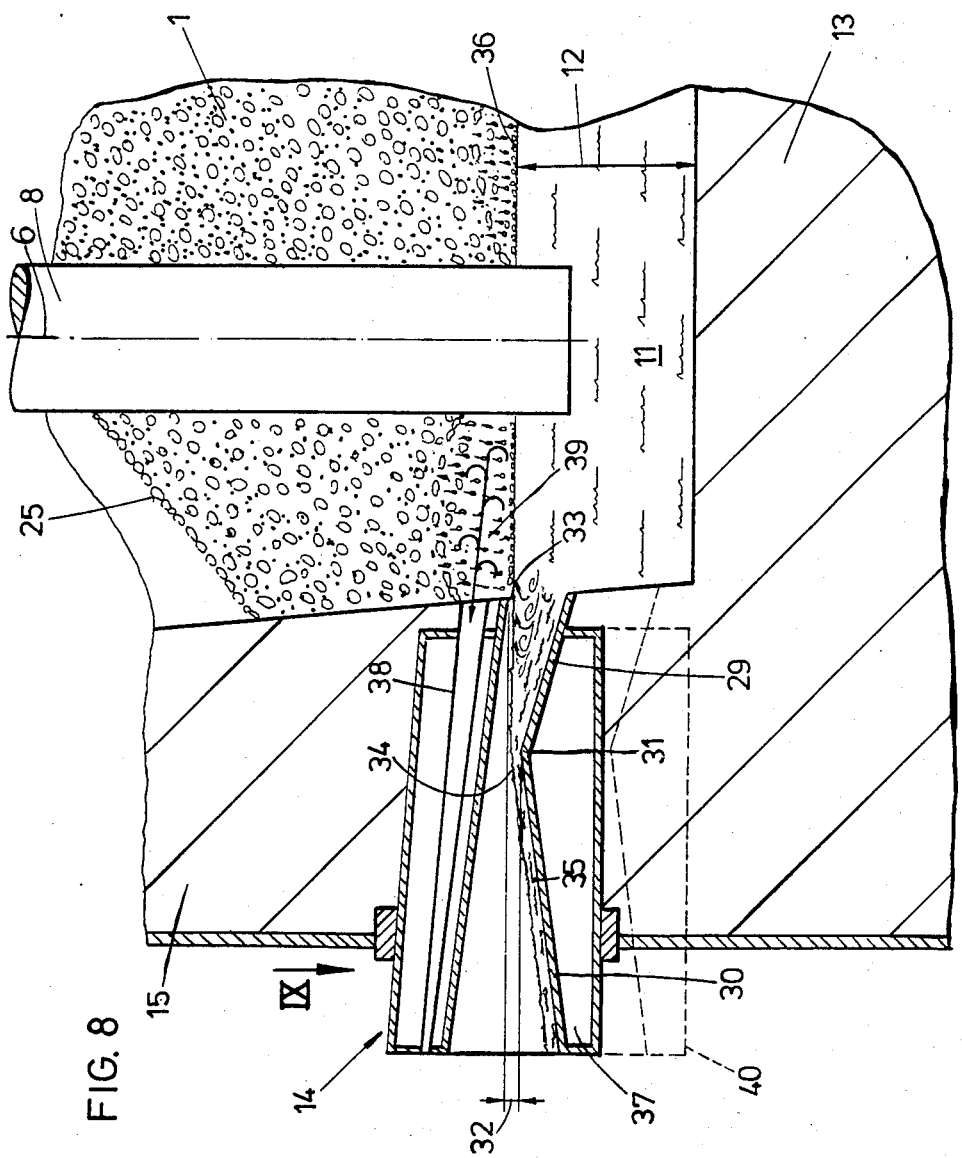

FIGS. 6 and 7 each show an embodiment of a transporting device;

FIG. 8 illustrates a detail VIII of FIG. 1 on an enlarged scale; and

FIG. 9 is a view of the tapping device in the direction of the arrow IX of FIG. 8.

An electric melting furnace 2 serving for melting spinnable mineral fine-particle or granular materials 1 comprises a furnace vessel 4 provided with a refractory lining 3 and is covered by a lid 5. Three electrodes 8 whose axes 6 are arranged on a partial circle 7 in the ground plan extend through the lid 5 into the furnace interior 9. Each one of the electrodes 8 is movable in the vertical direction into the melt bath 11 by means of a separate lifting and lowering mechanism 10 so as to adjust a certain immersion depth therein. At a slight height 12 above the bottom 13 of the furnace vessel, a tapping device 14 is provided, which penetrates a side wall 15 of the furnace vessel 4.

Dosing pipes 16 extend through the lid 5 into the furnace interior 9, which dosing pipes, in the ground plan, are provided close to the partial circle 7 formed by the electrodes 8, each between two electrodes 8 and parallel to the electrodes. The fine-particle or granular materials 1 to be charged get to one dosing pipe 16 each from a storage bunker 17 arranged above the furnace and above one transporting means 18 each. The melt emerging through the tapping device 14 flows to a spinner not illustrated in detail, via a tapping channel 19.

For uniformly introducing the fine-particle or granular materials 1 to the charged, the transporting means 18 according to one embodiment, are designed as vibrating channels 20, extending from the bunker outlet 21 to the upper opening 22 of the vertically arranged dosing pipes 16. The vibrating channels are always in operation and convey the fine-particle or granular materials 1 until the conveying openings 23 of the vibrating channels 20 are each closed by charging materials accumulating in the dosing pipe at the upper opening 22 thereof in the form of a dumping cone 24, as it is illustrated in FIG. 6. In this case, conveying of the vibrating channels automatically stops, although the channels remain in operation. As soon as the charging material 1 continues to slide through the dosing pipes 16 into the furnace interior 9 and the conveying openings 23 of the vibrating channels 20 are freed again, the vibrating channels 20 automatically go on conveying charging material 1 to the dosing pipes 16, so that the latter are always completely filled.

The fine-particle or granular materials penetrating into the furnace interior through the dosing pipes 16 form dumping cones 25 in the furnace interior, i.e. up to the height of the mounths 26 of the dosing pipes 16. On their lower ends, the dosing pipes 16 each have wall recesses 27 extending vertically upwardly from the mouths 26 and directed in the direction to the neighboring electrodes 8. These wall recesses have the effect that more of the materials 1 to be melted get to the regions of the electrodes 8. In FIG. 4, the peculiar shape of the dumping cones caused by the wall recesses 27 is illustrated by contour lines 28. Due to the fact that more materials 1 to be melted get to the electrodes 8 than with a normal shaping of the mouths 26 of the dosing pipes, the electrodes 8 are better protected, and the fact is taken into account that it is immediately around the electrodes 8 that the largest amount of materials 1 is melted.

For aiding a uniform outflow of melt per time unit, the tapping device 14 is formed by a water-cooled tapping pipe insertable into the side wall 15 of the electric melting furnace, which tapping pipe comprises a pipe portion 29 rising from the furnace inner side in the direction towards outside, and a pipe portion 30, at the furnace outer side, downwardly inclined in the same direction towards the furnace outer side.

Where the two pipe portions 29 and 30 run into each other, they form an overflow edge 31 located at the vertical distance 32 below the upper side of the mouth 33 of the pipe portion 29 located at the furnace inner side, so that the tapping device 14 has a passage 34 that is free in the horizontal direction. This design of the tapping device has the effect that the outflow melt 35 is not derived directly from the bath level 36 of the melt bath 11, but from the region of the melt bath 11 lying therebelow and having a higher temperature, wherein, however, a siphon effect is avoided. Thus, the melt 35 flows out uniformly as soon as the bath level 36 reaches the overflow edges.

In its ground plan, the pipe portion 29 rising at the furnace inner side in the direction towards the outside is designed so as to diverge towards the furnace interior for facilitating cleaning, should that pipe portion 29 freeze up.

Above the tapping pipe 29, 30, the hollow space 37 of the tapping device flowed through by coolant is penetrated by an aerating pipe 38 extending from the furnace outer side to the furnace inner side and rising towards the outside, which aerating pipe, for an easy cleaning, is also designed so as to diverge in the direction to the furnace interior 9. This aerating pipe 38 enters, as can be seen from FIG. 8, into the melting zone 39, i.e. into the region where the substances to be melted cake, and serves for guiding gases, forming in this region and possibly unfavorably influencing the uniform outflow of melt, from the furnace interior 9 towards the outside.

Gas is formed because of the reaction of the iron oxide mostly contained in the substances to be melted, with carbon, which leads to the formation of carbon monoxide. The amounts of gas locally forming are small, yet they suffice for negatively affecting the uniform outflow of melt 35 by acting on the bath level 36 in the direct vicinity of the tapping device 14.

At a level below the tapping means 14 a closable emergency tap 40 is provided, which is used in case of disturbances, e.g. for exchanging the tapping device 14. With its help, the bath level 36 can be lowered to such an extent that the tapping means 14 can be exchanged without having to interrupt the furnace operation. The emergency tap has the same design as the tapping device, i.e., it is also water-cooled, and it is arranged offset by about a quarter of the circumference of the electric melting furnace 2 relative to the tapping device 14. It is closable by means of a steel stopper, whereby the closing and opening of the emergency tap is easy to do.

For obtaining a high melting performance, the electric melting furnace is designed as a 3-phase rotary current furnace. The introduction of energy is effected by Ohm's heat, the materials 1 introduced constituting the ohmic resistance. The electric melting furnace is suited for melting blast furnace slag, which possibly may be admixed with sand, glass or fly-ash, as well as for the melting of minerals, such as diabase, granite, porphyrite. The grain size of the materials used suitably lies between 2 and 30 mm. The immersion depths of the electrodes are adjusted for a constant performance, the electrodes 8 being individually controlled.

The electric melting furnace furthermore comprises a bottom tap 41 of conventional kind which serves for emptying the electric melting furnace and tapping possibly melted pig iron collecting at the furnace bottom 13.

In FIG. 7 a further embodiment of a transporting means leading from the storage bunker 17 to the dosing pipes 16 is shown. This transporting means is a worm conveyor 42 whose delivery spot 43 is located above the dosing pipe 16. For ensuring a uniform charging, a sensor 44, e.g., a photoelectric barrier, is provided at the upper opening 22 of the dosing pipe 16, which sensor stops the transporting means if the dosing pipe is completely filled and a dumping cone 24 is forming.

If iron-oxide-containing substances are to be melted, according to the invention aluminum is added to the materials, possibly with aluminum oxide, which reduces the iron oxide to metallic iron. The iron collects at the bottom of the electric melting furnace. As additions, aluminum wastes from the aluminum industry, such as, e.g., low-grade aluminum dross are particularly suitable. Such dross occurs in aluminum foundries and similar enterprises, when the bath is scummed and is formed of aluminum oxide with metal residues adhering thereto.

Dross having an aluminum content of less than 30% is not suited for an economic processing or further use as coupling product, such as, e.g., anti-piping compound or the like. Such dross that hitherto had to be dumped may be used advantageously for the production of wool from mineral materials. The dross provides both, metallic reducing agents for the undesired iron oxide as well as the alumina that otherwise would have to be alloyed thereto in the form of mineral raw materials. A particular advantage of adding aluminum dross is that no gaseous reduction products are formed at the reduction of the iron and that heat is set free at the reaction with aluminum, as opposed to the reaction with carbon.

The following table gives an example of the composition of the material to be melted (porphyrite), of the aluminum dross added thereto, and of the melt drawn off.

|  | porphyrite | | aluminum dross | | melt drawn off | |
| --- | --- | --- | --- | --- | --- | --- |
|  | [% by weight] | [kg] | [% by weight] | [kg] | [% by weight] | [kg] |
| SiO₂ | 64.55 | 64.55 | n.d. | — | 64.55 | 64.33 |
| Al₂O₃ | 11.06 | 11.06 | 70 | 7.98 | 19.04 | 18.97 |
| CaO | 5.86 | 5.86 | n.d. | — | 5.86 | 5.84 |
| MgO | 4.34 | 4.34 | n.d. | — | 4.34 | 4.32 |
| Na₂O | 2.80 | 2.80 | n.d. | — | 2.80 | 2.79 |
| K₂O | 2.63 | 2.63 | n.d. | — | 2.63 | 2.62 |
| Fe as FeO | 6.28 | 6.28 | n.d. | — | — | — |
| TiO₂ | 1.13 | 1.13 | n.d. | — | 1.13 | 1.13 |
| annealing loss | 1.37 | 1.37 | n.d. | — | — | — |
| Al | — | — | 22 | — | — | — |

The amount of aluminum dross required for the reduction of the iron oxide is calculated according to the following reaction equation:

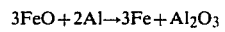

$$3FeO + 2Al \rightarrow 3Fe + Al_2O_3$$

If more aluminum dross is used, there follows a further sequence of metallo-thermic reactions due to the affinity difference of aluminum to the remaining oxidic components of the melt. These are, in order, K, Na, Si, Ti.

What we claim is:

1. In an electric furnace arrangement for continuously melting mineral fine-particle or granular materials capable of being spun from melt thereof, said arrangement including a refractory lined vessel having an opening covered by a lid, a side wall and a bottom, a plurality of vertically movable electrodes extending into said furnace from above through openings in said lid, said electrodes being spaced from each other along a partial circle, said arrangement also including means for charging said materials into said furnace to be melted and tapping means extending through the side wall thereof for discharging molten material from said furnace, the improvement wherein:

said charging means includes a plurality of spaced dosing pipes extending from above into said furnace, each of said pipes having a material-receiving opening at its top end and a material discharge opening at its bottom end extending through the lid of said furnace, said spaced dosing pipes being each disposed closely adjacent said partial circle and between two of each of said electrodes, each of said dosing pipes having cooperatively associated therewith material transporting means in the form of a channel, each having a material discharge end disposed above the material-receiving opening of each of said dosing pipes, whereby during charging of said furnace, said dosing pipes are maintained filled, the material-receiving opening of each of said dosing pipes being characterized in that when full, the material forms an upwardly directed conical pile which used as an indication for interrupting the further discharge of material to the pipes, 2. The electric furnace arrangement as set forth in claim 1, wherein each dosing pipe has a sensor cooperatively associated with its material-receiving end adapted to interrupt material discharged thereto from said material transporting means.

3. The electric melting furnace arrangement as set forth in claim 1, wherein said transporting means are vibrating channels.

4. The electric melting furnace arrangement as set forth in claim 1, wherein said transporting means are conveyor belts.

5. The electric melting furnace arrangement as set forth in claim 1, wherein said transporting means are worm conveyors.

6. The electric melting furnace arrangement as set forth in claim 1, wherein said dosing pipes at the material discharge end at sides facing the electrodes each have wall recesses extending vertically upward from the discharge end of said dosing pipes.

7. The electric melting furnace arrangement as set forth in claim 1, wherein said transporting means is designed as vibrating channel having a material discharge opening disposed above the material-receiving opening of said dosing pipe, and wherein, when an upwardly disposed cone forms at the material-receiving opening of said dosing pipe, further discharge of the materials to be melted is automatically interrupted by means of the vibrating channel.

8. The electric melting furnace arrangement as set forth in claim 7, wherein each dosing pipe at its material-receiving opening further comprises a sensor for interrupting the transporting discharging means when the dosing pipe is completely filled as evidenced by the formation of an upwardly directed cone.

9. The electric melting furnace arrangement as set forth in claim 8, wherein said sensor is a photoelectric means.

* * * * *